US012258912B1

(12) United States Patent
Tatsumi et al.

(10) Patent No.: US 12,258,912 B1
(45) Date of Patent: Mar. 25, 2025

(54) GAS TURBINE CONTROL DEVICE AND GAS TURBINE CONTROL METHOD

(71) Applicant: MITSUBISHI HEAVY INDUSTRIES, LTD, Tokyo (JP)

(72) Inventors: Naoya Tatsumi, Tokyo (JP); Takashi Nishiumi, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/802,196

(22) Filed: Aug. 13, 2024

(30) Foreign Application Priority Data

Sep. 5, 2023 (JP) .................................. 2023-143312

(51) Int. Cl.
*F02C 9/28* (2006.01)
*F02C 7/224* (2006.01)
*F02C 9/20* (2006.01)

(52) U.S. Cl.
CPC ................ *F02C 9/28* (2013.01); *F02C 7/224* (2013.01); *F02C 9/20* (2013.01); *F05D 2240/35* (2013.01); *F05D 2270/303* (2013.01)

(58) Field of Classification Search
CPC .. F02C 7/224; F02C 7/042; F02C 9/00; F02C 9/20; F02C 9/28; F02C 9/50; F02C 9/54; F01D 17/14; F01D 17/16
See application file for complete search history.

(56) References Cited

U.S. PATENT DOCUMENTS

| 10,208,678 | B2 * | 2/2019 | Uyama | F02C 7/04 |
| 10,669,959 | B2 * | 6/2020 | Sonoda | F02C 9/54 |
| 12,012,905 | B2 * | 6/2024 | Yamamoto | F02C 9/46 |
| 2012/0017600 | A1 * | 1/2012 | Saito | F02C 3/10 60/773 |
| 2014/0090395 | A1 * | 4/2014 | Appukuttan | F02C 7/141 60/734 |
| 2017/0074175 | A1 * | 3/2017 | Uyama | F02C 9/28 |
| 2017/0254282 | A1 * | 9/2017 | Sonoda | F02C 9/22 |
| 2019/0063335 | A1 * | 2/2019 | Takaki | F02C 9/28 |
| 2021/0148291 | A1 * | 5/2021 | Yamamoto | F02C 7/228 |

FOREIGN PATENT DOCUMENTS

| JP | 7-189743 | 7/1995 | |
| JP | 2007077866 A | * 3/2007 | .............. F02C 9/263 |

* cited by examiner

*Primary Examiner* — Alain Chau
(74) *Attorney, Agent, or Firm* — Wenderoth, Lind & Ponack, L.L.P.

(57) ABSTRACT

A gas turbine includes a combustor that can combust fuel, which can be heated by a heater, by mixing the fuel with compressed air generated by a compressor. The compressor includes an inlet guide vane for adjusting an amount of intake air. When a deviation between the temperature of the fuel at an outlet section of the heater and a set temperature of the heater exceeds a threshold value, the gas turbine control device controls the opening degree of the inlet guide vane to become larger than the opening degree when the deviation is equal to or smaller than the threshold value.

9 Claims, 12 Drawing Sheets

GAS TURBINE CONTROL DEVICE AND GAS TURBINE CONTROL METHOD

CROSS-REFERENCE TO RELATED APPLICATIONS

This application claims the benefit of priority to Japanese Patent Application Number 2023-143312 filed on Sep. 5, 2023. The entire contents of the above-identified application are hereby incorporated by reference.

TECHNICAL FIELD

The disclosure relates to a gas turbine control device and a gas turbine control method.

RELATED ART

A known gas turbine includes a combustor that can combust fuel by mixing the fuel with compressed air generated by a compressor. In this type of gas turbine, a fuel density changes when the temperature of the fuel supplied to the combustor is low, which may affect the operating state of the gas turbine. For example, JP 07-189743 A discloses a technique relating to gas turbine control for reducing the influence of a change in a fuel temperature by adjusting the flow rate of fuel or air supplied to a combustor in response to the change in the fuel temperature.

SUMMARY

When the temperature of the fuel supplied to the combustor is low, a fuel pressure differential in a fuel injection nozzle included in the combustor decreases (or an injection flow velocity decreases) due to a change in a fuel density, the combustor operates in a different combustion state than during normal operation, and thus combustion oscillation is likely to occur. In JP 07-189743 A, the gas turbine control is performed to reduce the influence of the fuel temperature by adjusting the flow rate of fuel or air supplied to the combustor. However, there are cases where combustion oscillation cannot be avoided only by such flow rate adjustment.

Another known gas turbine includes a heater for heating fuel when the temperature of the fuel supplied to the combustor is low. The heater can heat the fuel to a predetermined set temperature by heat exchange with a heat exchange medium such as feedwater from a steam turbine that constitutes a system in common with the gas turbine. However, since the temperature of the heat exchange medium is low during the startup of the gas turbine or in the case of increasing a load on the gas turbine from a low load state, there may be a case where the fuel cannot be sufficiently heated by the heater. In this case, a deviation between the fuel temperature at an outlet section of the heater and the set temperature remains large, and thus there is a possibility that combustion oscillation cannot be avoided.

At least one embodiment of the disclosure has been made in view of the above-described circumstances, and an object thereof is to provide a gas turbine control device and a gas turbine control method that can suitably avoid combustion oscillation that occurs when a fuel temperature is low, regardless of a design condition of a nozzle pressure differential of a combustor.

In order to solve the above problem, a gas turbine control device according to at least one embodiment of the disclosure is a gas turbine control device for controlling a gas turbine including a combustor that can combust fuel by mixing the fuel with compressed air;
a heater for heating the fuel to a set temperature;
a compressor for generating the compressed air; and
an inlet guide vane for adjusting an amount of intake air of the compressor, and includes
a fuel temperature detection unit for detecting a temperature of the fuel at an outlet section of the heater; and
an inlet guide vane control unit for controlling an opening degree of the inlet guide vane based on an output of the gas turbine.

When a deviation between the temperature of the fuel detected by the fuel temperature detection unit and the set temperature exceeds a threshold value, the inlet guide vane control unit controls the opening degree of the inlet guide vane to become larger than the opening degree when the deviation is equal to or smaller than the threshold value.

In order to solve the above problem, a gas turbine control method according to at least one embodiment of the disclosure is a gas turbine control method for controlling a gas turbine including a combustor that can combust fuel by mixing the fuel with compressed air;
a heater for heating the fuel to a set temperature;
a compressor for generating the compressed air; and
an inlet guide vane for adjusting an amount of intake air of the compressor, and includes
detecting a temperature of the fuel at an outlet section of the heater; and
controlling an opening degree of the inlet guide vane based on an output of the gas turbine.

In the controlling the inlet guide vane, when a deviation between the temperature of the fuel detected in the detecting and the set temperature exceeds a threshold value, the opening degree of the inlet guide vane is controlled to become larger than the opening degree when the deviation is equal to or smaller than the threshold value.

According to at least one embodiment of the disclosure, it is possible to provide a gas turbine control device and a gas turbine control method that can suitably avoid combustion oscillation that occurs when a fuel temperature is low, regardless of a design condition of a nozzle pressure differential of a combustor.

BRIEF DESCRIPTION OF DRAWINGS

The disclosure will be described with reference to the accompanying drawings, wherein like numbers reference like elements.

DESCRIPTION OF EMBODIMENTS

Figure 1:
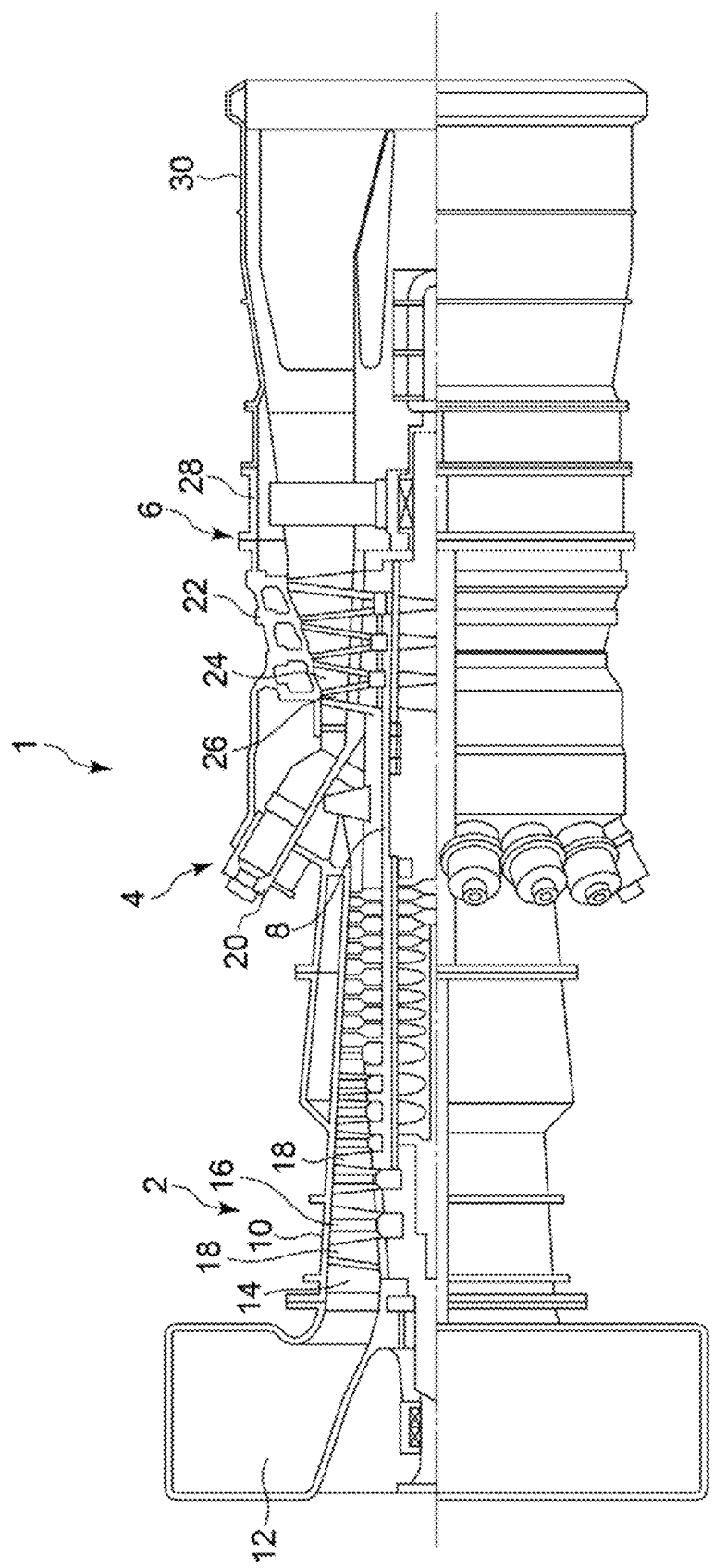
FIG. 1 is a schematic configuration diagram of a gas turbine according to one embodiment.

Some embodiments of the disclosure will be described below with reference to the accompanying drawings. However, configurations described in the embodiments or illustrated in the drawings shall be interpreted as illustrative only and not intended to limit the scope of the disclosure thereto.

Figure 2:
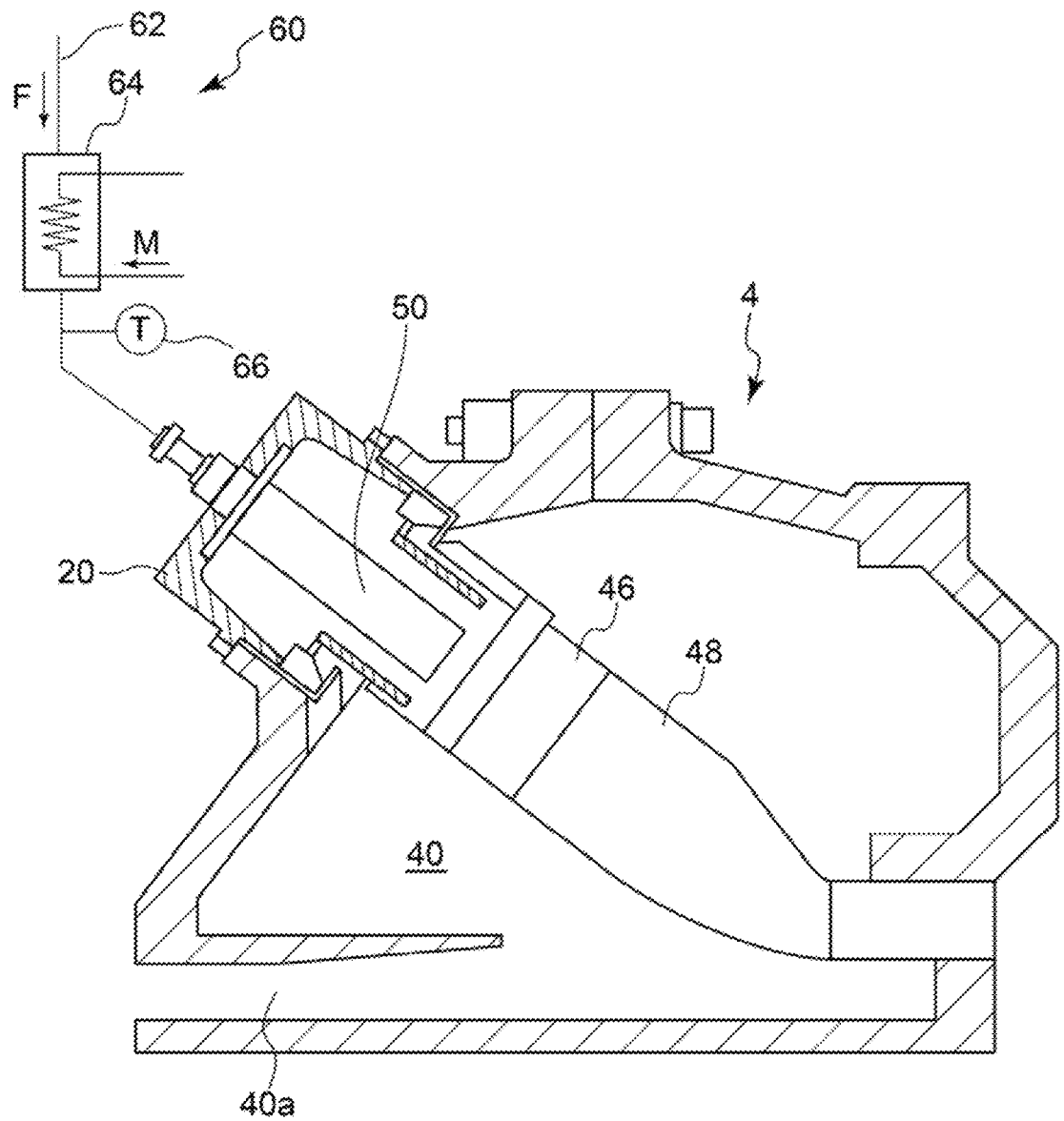
FIG. 2 is a schematic cross-sectional view of a combustor of FIG. 1.

First, a configuration of a gas turbine to which a gas turbine control method according to at least one embodiment of the disclosure is applied will be described with reference to FIGS. 1 and 2. FIG. 1 is a schematic configuration diagram of a gas turbine 1 according to one embodiment, and FIG. 2 is a schematic cross-sectional view of a combustor 4 of FIG. 1.

The gas turbine 1 includes a compressor 2 for generating compressed air as an oxidizing agent, a combustor 4 for generating combustion gas by using the compressed air and fuel F, and a turbine 6 configured to be rotationally driven by the combustion gas. In the case of the gas turbine 1 for power generation, a generator (not illustrated) is connected to the turbine 6 and power is generated by the rotational energy of the turbine 6.

The compressor 2 includes a compressor casing 10, an air intake port 12 provided on an inlet side of the compressor casing 10 for taking in air, a rotor 8 provided so as to penetrate through both the compressor casing 10 and a turbine casing 22 to be described below, and various blades disposed in the compressor casing 10. The various blades include an inlet guide vane 14 provided on the air intake port 12 side, a plurality of stator vanes 16 fixed on the compressor casing 10 side, and a plurality of rotor blades 18 implanted in the rotor 8 so as to be alternately arrayed with respect to the stator vanes 16.

Note that the compressor 2 may include other components such as an extracted air chamber (not illustrated). In this type of compressor 2, the air taken in from the air intake port 12 passes through the plurality of stator vanes 16 and the plurality of rotor blades 18 and is thereby compressed to be high-temperature and high-pressure compressed air. Then, the high-temperature and high-pressure compressed air is sent from the compressor 2 to the combustor 4 in a subsequent stage.

The combustor 4 is disposed in a casing 20. A plurality of the combustors 4 may be disposed in an annular shape about the rotor 8 in the casing 20. The fuel F and the compressed air generated in the compressor 2 is supplied to the combustor 4 and the fuel F is combusted, whereby combustion gas which is a working fluid of the turbine 6 is generated. Then, the combustion gas is sent from the combustor 4 to the turbine 6 downstream.

The turbine 6 includes a turbine casing 22 and various blades disposed in the turbine casing 22. The various blades include a plurality of stator vanes 24 fixed on the turbine casing 22 side and a plurality of rotor blades 26 implanted in the rotor 8 so as to be alternately arrayed with respect to the stator vanes 24. Note that the turbine 6 may include other components such as an outlet guide vane. In the turbine 6, the combustion gas passes through the plurality of stator vanes 24 and the plurality of rotor blades 26, whereby the rotor 8 is rotationally driven. As a result, the generator connected to the rotor 8 is driven.

An exhaust chamber 30 is connected on the downstream side of the turbine casing 22 via an exhaust casing 28. The combustion gas after driving the turbine 6 is discharged to the outside via the exhaust casing 28 and the exhaust chamber 30.

As illustrated in FIG. 2, the combustor 4 includes a combustor liner 46 provided at a combustor casing 40 defined by the casing 20, and a fuel injection nozzle 50 for injecting the fuel F in the combustor liner 46.

The fuel F is supplied from a fuel supply system 60 to the fuel injection nozzle 50. The fuel F is, for example, natural gas, but may contain a component having a higher combustion speed than natural gas, such as hydrogen. The fuel F injected from the fuel injection nozzle 50 is mixed with combustion air from the compressor 2 and thereby combusted in the combustor liner 46. The combustion gas generated by the combustion is supplied to the turbine 6 via a transition piece 48 connected to the downstream side of the combustor liner 46.

The fuel supply system 60 includes a fuel supply line 62 for supplying the fuel F from a fuel supply source (not illustrated). The fuel supply line 62 is provided with a heater 64 for heating the fuel F. The heater 64 is a device for heating the fuel F flowing through the fuel supply line 62. A temperature sensor 66 for detecting the temperature of the fuel F (hereinafter, appropriately referred to as "fuel temperature Tf") that has passed through the heater 64 is provided at an outlet section of the heater 64 in the fuel supply line 62. The heater 64 is controlled by a gas turbine control device 100 to be described below such that the fuel temperature Tf detected by the temperature sensor 66 becomes a preset temperature (hereinafter, appropriately referred to as a "set temperature Ts").

In the present embodiment, the heater 64 is configured as a heat exchanger that can heat the fuel F flowing through the fuel supply line 62 by exchanging heat with a heat exchange medium M. The heater 64 is a counter-flow heat exchanger configured such that the fuel F flowing through the fuel supply line 62 and the heat exchange medium M face each other. The heat exchange medium M is supplied from, for example, a steam turbine (not illustrated) that constitutes a system in common with the gas turbine 1. However, since the temperature of the heat exchange medium is low during the startup of the gas turbine 1 or in the case of increasing an output L of the gas turbine 1 from a low load state, there may be a case where the fuel F cannot be sufficiently heated by the heater 64. In this case, a deviation $\Delta T$ between the fuel temperature Tf at the outlet section of the heater 64 and the set temperature Ts becomes large, and thus combustion oscillation may occur in the combustor 4. Such combustion oscillation can be suitably avoided by a gas turbine control method executed by the gas turbine control device 100 to be described below.

Although not illustrated in FIG. 2, the fuel supply system 60 appropriately includes a flow rate regulator valve for regulating the flow rate of the fuel F, a shutoff valve for shutting off the fuel F, and the like on the fuel supply line 62.

Figure 3:
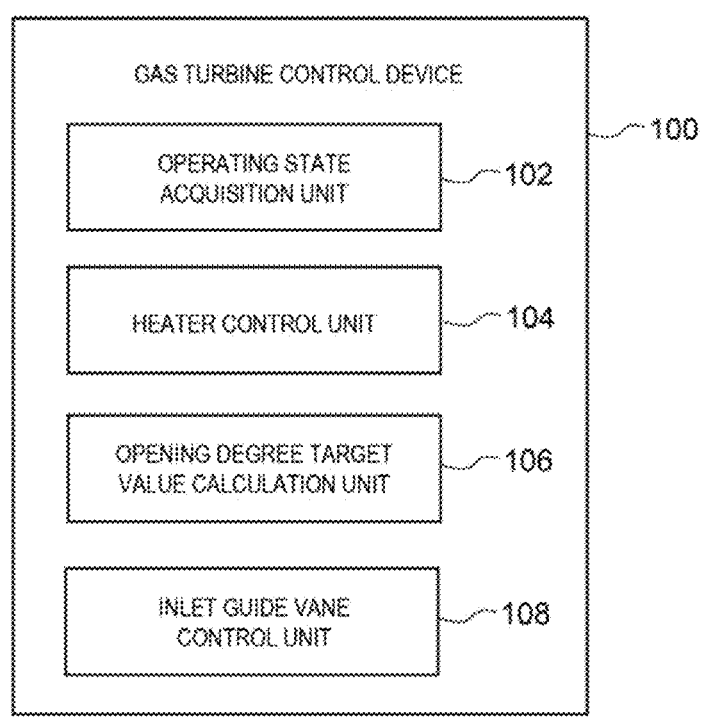
FIG. 3 is a configuration diagram of a gas turbine control device according to one embodiment.

Next, the gas turbine control device 100 for controlling the gas turbine 1 having the above-described configuration will be described. FIG. 3 is a configuration diagram of the gas turbine control device 100 according to one embodiment.

The gas turbine control device 100 is a control unit for controlling the gas turbine 1 and includes, for example, a central processing unit (CPU), a random access memory (RAM), a read only memory (ROM), a computer-readable storage medium, and the like. A series of processes for implementing various functions is stored in a storage medium or the like in the form of a program, for example, and the CPU reads the program into the RAM or the like and executes information processing and computation processing, thereby implementing various functions. Note that the program may be installed in advance in the ROM or another storage medium, may be provided in the form of being stored in a computer-readable storage medium, or may be distributed through wired or wireless communication means. The computer-readable storage medium includes a magnetic disk, a magneto-optical disk, a CD-ROM, a DVD-ROM, and a semiconductor memory.

As illustrated in FIG. 3, the gas turbine control device 100 includes an operating state acquisition unit 102, a heater control unit 104, an opening degree target value calculation unit 106, and an inlet guide vane control unit 108.

The operating state acquisition unit 102 is a component for acquiring various kinds of information relating to the operating state of the gas turbine 1. In the present embodiment, the operating state acquisition unit 102 acquires, as the information relating to the operating state of the gas turbine 1, at least a gas turbine output L, the fuel temperature Tf, an intake air temperature Tk, a calorie value C of the fuel F, and an opening degree D of the inlet guide vane 14.

The heater control unit 104 is a component for controlling the heater 64. As described above, the heater 64 heats the fuel F such that the fuel temperature Tf becomes the set temperature Ts by exchanging heat between the fuel F and the heat exchange medium M. Specifically, the heater control unit 104 heats the fuel F such that the fuel temperature Tf becomes the set temperature Ts by adjusting at least one of the temperature or the flow rate of the heat exchange medium M introduced into the heater 64. The set temperature Ts is set in advance as a target value of the fuel temperature Tf.

The opening degree target value calculation unit 106 is a component for calculating a control target value related to the opening degree D of the inlet guide vane 14 (hereinafter, appropriately referred to as an "opening degree target value Dt"). The opening degree target value Dt calculated by the opening degree target value calculation unit 106 is input to the inlet guide vane control unit 108. The inlet guide vane control unit 108 is a component for controlling the opening degree D of the inlet guide vane 14 to become the opening degree target value Dt calculated by the opening degree target value calculation unit 106. Accordingly, in the present embodiment, when the deviation ΔT between the fuel temperature Tf and the set temperature Ts of the heater 64 exceeds a threshold value ΔTth, the opening degree control for the inlet guide vane 14 is performed such that the opening degree D of the inlet guide vane 14 becomes larger than the opening degree D when the deviation ΔT is equal to or smaller than the threshold value ΔTth.

Figure 4:
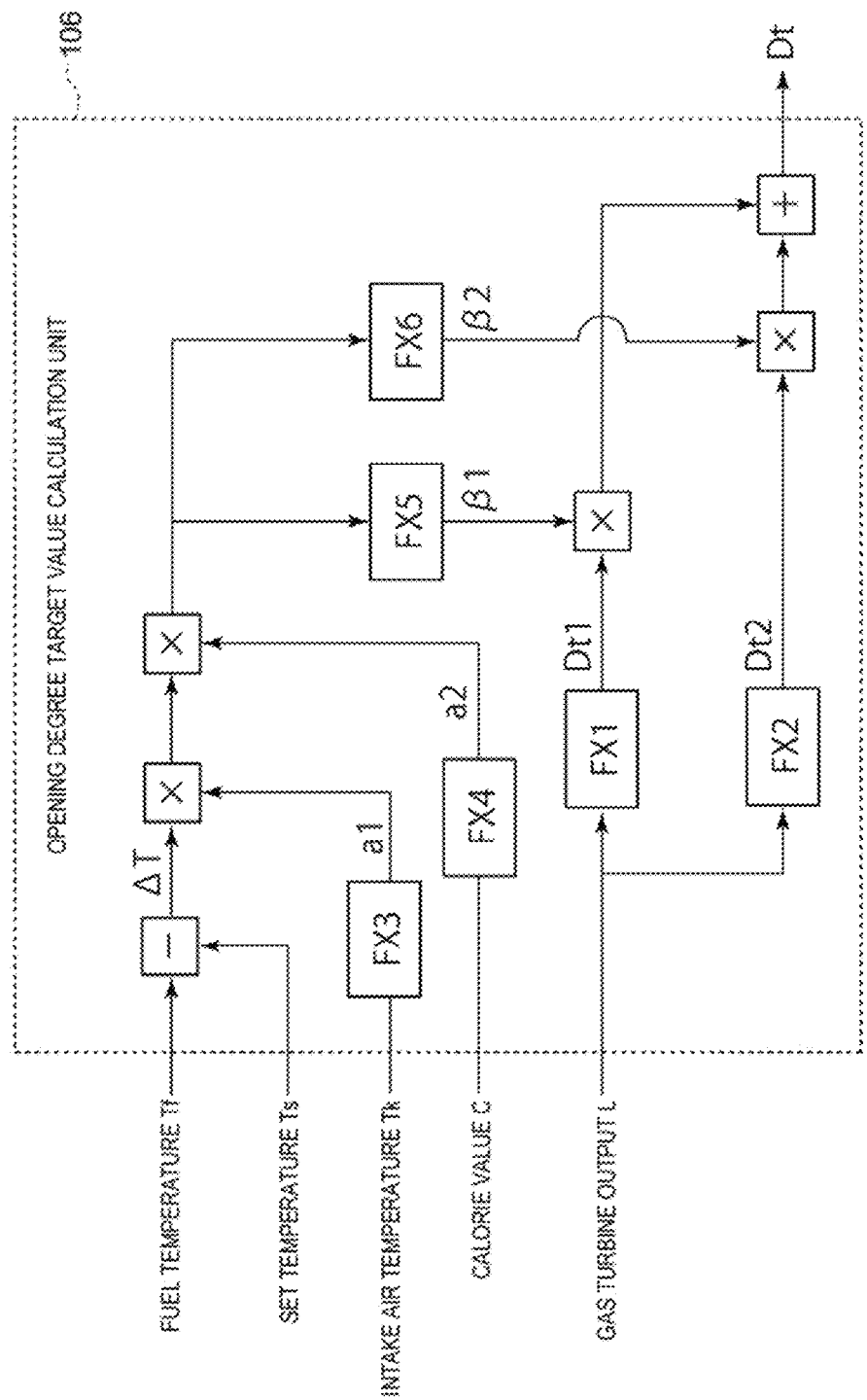
FIG. 4 is a diagram illustrating a control flow of an opening degree target value calculation unit of FIG. 3.

Here, a logic for calculating the opening degree target value Dt in the opening degree target value calculation unit 106 will be described in detail with reference to FIG. 4. FIG. 4 is a diagram illustrating a control flow of the opening degree target value calculation unit 106 of FIG. 3.

The opening degree target value calculation unit 106 inputs the gas turbine output L out of the information relating to the operating state acquired by the operating state acquisition unit 102 to a first function FX1, thereby calculating a corresponding first opening degree target value Dt1. The first function FX1 is a function that defines the correlation between the gas turbine output L and the first opening degree target value Dt1, and is prepared in advance by an experimental, theoretical, or simulation method.

Figure 5:
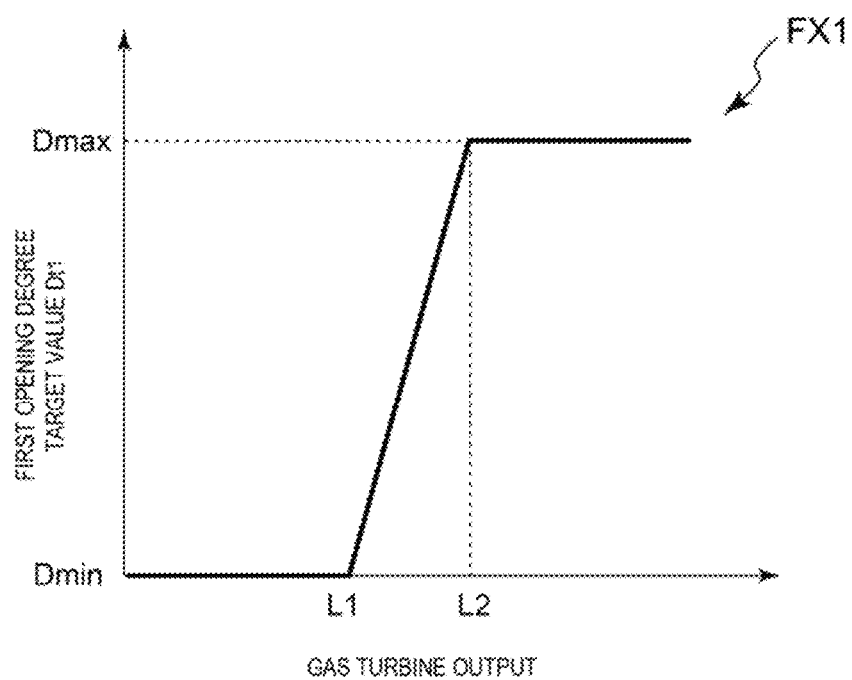
FIG. 5 is an example of a first function of FIG. 4.

FIG. 5 is an example of the first function FX1 of FIG. 4. The first function FX1 is defined such that the first opening degree target value Dt1 increases as the gas turbine output L increases. In this example, the first function FX1 is defined such that the first opening degree target value Dt1 is a constant minimum opening degree Dmin in a range in which the gas turbine output L is equal to or smaller than a first output L1, the first opening degree target value Dt1 monotonically increases at an increase rate R1 in proportion to the gas turbine output L in a range in which the gas turbine output L is from the first output L1 to a second output L2 (>L1), and the first opening degree target value Dt1 is a constant maximum opening degree Dmax in a range in which the gas turbine output L is larger than the second output L2.

Further, the opening degree target value calculation unit 106 inputs the gas turbine output L out of the information relating to the operating state acquired by the operating state acquisition unit 102 to a second function FX2, thereby calculating a corresponding second opening degree target value Dt2. The second function FX2 is a function that defines the correlation between the gas turbine output L and the second opening degree target value Dt2, and is prepared in advance by an experimental, theoretical, or simulation method.

Figure 6:
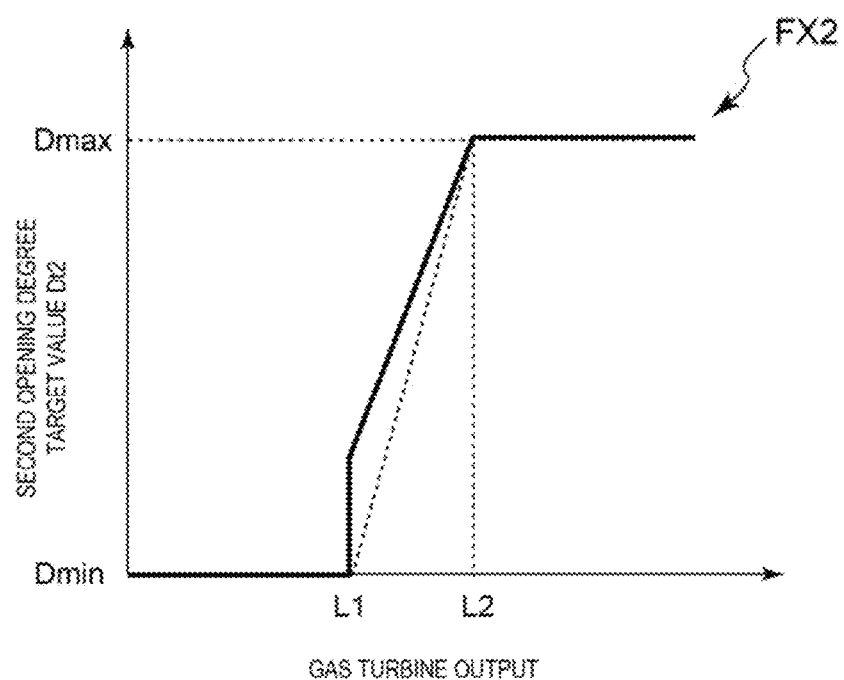
FIG. 6 is an example of a second function of FIG. 4.

FIG. 6 is an example of the second function FX2 of FIG. 4. The second function FX2 is defined such that the second opening degree target value Dt2 increases as the gas turbine output L increases. In this example, the second function FX2 is defined such that the second opening degree target value Dt2 is the constant minimum opening degree Dmin in a range in which the gas turbine output L is equal to or smaller than the first output L1, the second opening degree target value Dt2 increases with respect to the gas turbine output L in a range in which the gas turbine output L is from the first output L1 to the second output L2 (>L1), and the second opening degree target value Dt2 is the constant maximum opening degree Dmax in a range in which the gas turbine output L is larger than the second output L2. When compared with the first function FX1 described above, the second function FX2 has an increase rate R2 larger than the increase rate of the first function FX1 in a range in which the gas turbine output L is from the first output L1 to the second output L2 (>L1).

Furthermore, the opening degree target value calculation unit 106 obtains a deviation ΔT between the fuel temperature Tf out of the information relating to the operating state acquired by the operating state acquisition unit 102 and the set temperature Ts of the heater 64. In the present embodiment, the deviation ΔT is corrected by a first correction coefficient a1 and a second correction coefficient a2.

The first correction coefficient a1 is set to increase as the intake air temperature Tk of the compressor decreases. Specifically, the first correction coefficient a1 is obtained by inputting the intake air temperature Tk to a third function FX3. The third function FX3 is a function that defines the correlation between the intake air temperature Tk and the first correction coefficient a1, and is prepared in advance by an experimental, theoretical, or simulation method.

Figure 7:
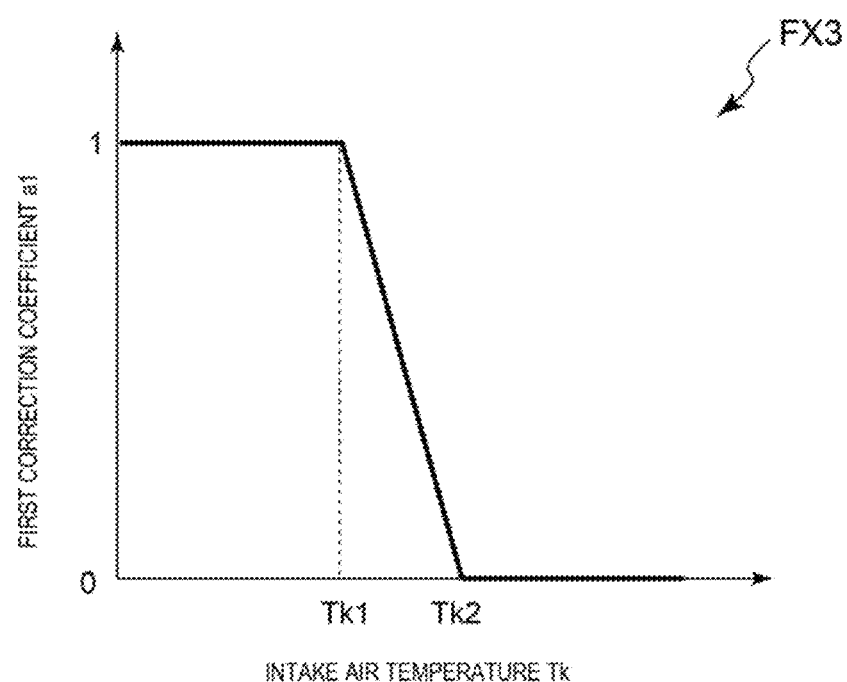
FIG. 7 is an example of a third function of FIG. 4.

FIG. 7 is an example of the third function FX3 of FIG. 4. The third function FX3 is defined such that the first correction coefficient a1 decreases as the intake air temperature Tk increases. In this example, the third function FX3 is defined such that the first correction coefficient a1 is a constant value of "1" in a range in which the intake air temperature Tk is equal to or lower than a first value Tk1, the first correction coefficient a1 decreases in inverse proportion to the intake air temperature Tk in a range in which the intake air temperature Tk is from the first value Tk1 to a second value Tk2 (>Tk1), and the first correction coefficient a1 is a constant value of "0" in a range in which the intake air temperature Tk is higher than the second value Tk2.

The second correction coefficient a2 is set based on the calorie value C of the fuel F. Specifically, the second correction coefficient a2 is obtained by inputting the calorie value C of the fuel F to a fourth function FX4. The fourth function FX4 is a function that defines the correlation between the calorie value C and the second correction coefficient a2, and is prepared in advance by an experimental, theoretical, or simulation method.

Figure 8:
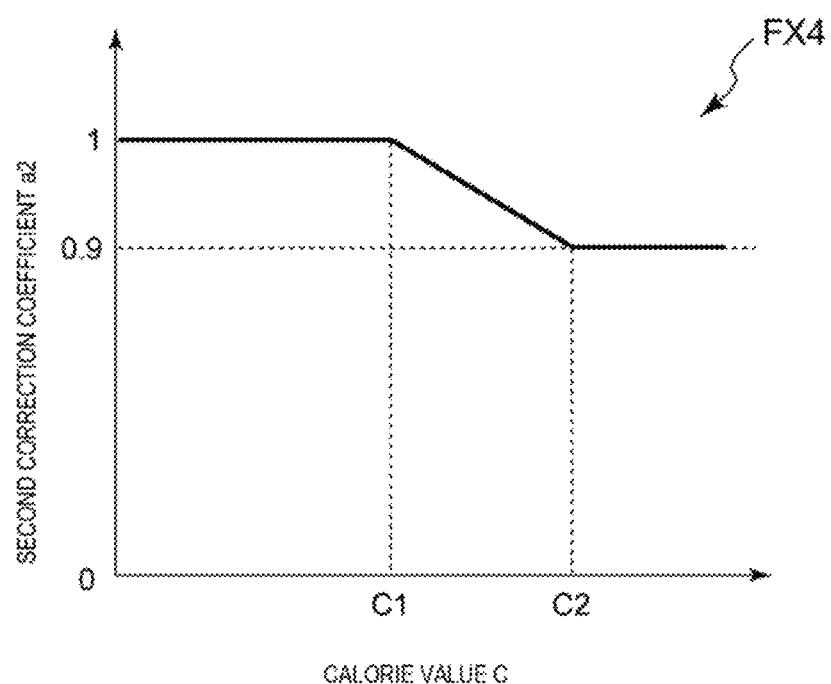
FIG. 8 is an example of a fourth function of FIG. 4.

FIG. 8 is an example of the fourth function FX4 of FIG. 4. The fourth function FX4 is defined such that the second correction coefficient a2 decreases as the calorie value C increases. In this example, the fourth function FX4 is defined such that the second correction coefficient a2 is substantially constant at "1.0" in a range in which the calorie value C is smaller than a first value C1, the second correction coefficient a2 monotonically decreases as the calorie value C increases in a range in which the calorie value C is equal to or larger than the first value C1 and smaller than a second value C2, and the second correction coefficient a2 is substantially constant at "0.9" in a range in which the calorie value C is equal to or larger than the second value C2.

The deviation $\Delta T$ corrected by the first correction coefficient a1 and the second correction coefficient a2 as described above is input to a fifth function FX5 and a sixth function FX6, whereby a first weighting coefficient $\beta 1$ corresponding to the first opening degree target value Dt1 and a second weighting coefficient $\beta 2$ corresponding to the second opening degree target value Dt2 are calculated, respectively. The first weighting coefficient $\beta 1$ and the second weighting coefficient $\beta 2$ are used to calculate the opening degree target value Dt by adding the first opening degree target value Dt1 and the second opening degree target value Dt2 with predetermined weighting as shown in the following equation.

$$Dt = Dt1 \times \beta 1 + Dt2 \times \beta 2$$

As will be described in detail below, the opening degree target value Dt is calculated such that the opening degree D of the inlet guide vane 14 is smaller when the deviation $\Delta T$ is larger than the threshold value $\Delta T$th than when the deviation $\Delta T$ is equal to or smaller than the threshold value $\Delta T$th.

Figure 9:
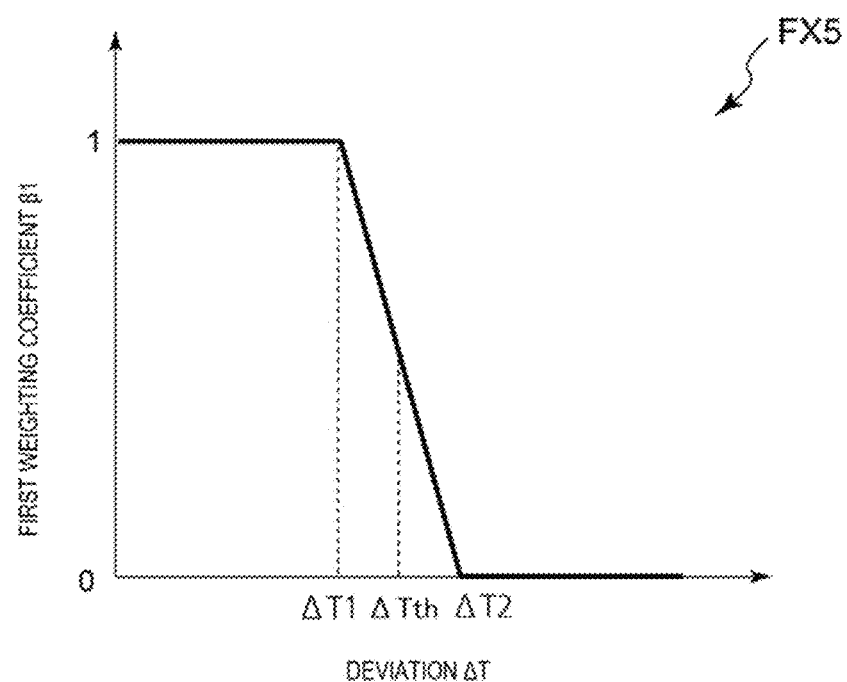
FIG. 9 is an example of a fifth function of FIG. 4.

FIG. 9 is an example of the fifth function FX5 of FIG. 4. The fifth function FX5 is defined such that the first weighting coefficient $\beta 1$ corresponding to the first opening degree target value Dt1 decreases as the deviation $\Delta T$ increases. In this example, the fifth function FX5 is defined such that the first weighting coefficient $\beta 1$ is a constant value of "1" in a range in which the deviation $\Delta T$ is equal to or smaller than a first value $\Delta T1$, the first weighting coefficient $\beta 1$ decreases in inverse proportion to the deviation $\Delta T$ in a range in which the deviation $\Delta T$ is from the first value $\Delta T1$ to a second value $\Delta T2$ (>$\Delta T1$), and the first weighting coefficient $\beta 1$ is a constant value of "0" in a range in which the deviation $\Delta T$ is larger than the second value $\Delta T2$.

Figure 10:
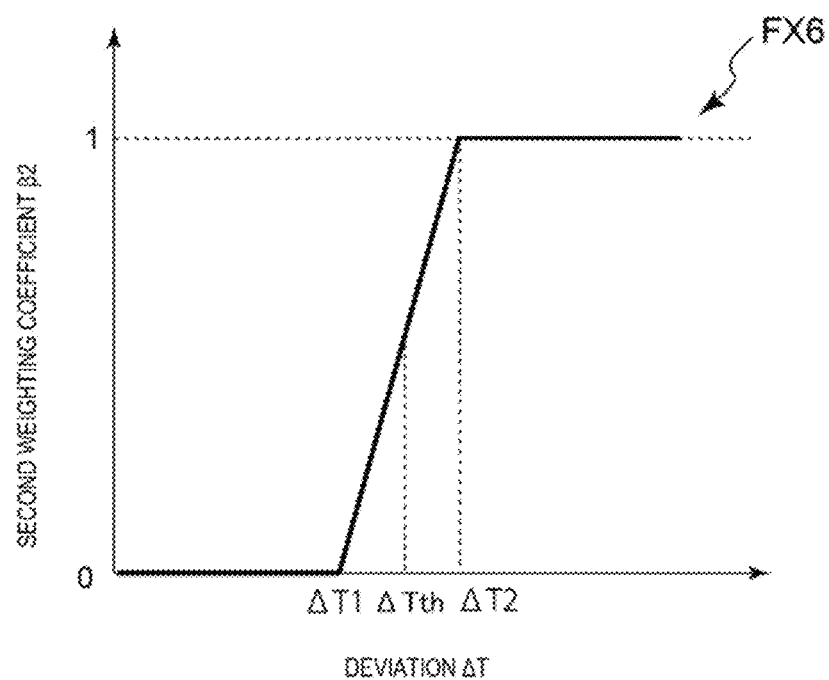
FIG. 10 is an example of a sixth function of FIG. 4.

FIG. 10 is an example of the sixth function FX6 of FIG. 4. The sixth function FX6 is defined such that the second weighting coefficient $\beta 2$ corresponding to the second opening degree target value Dt2 increases as the deviation $\Delta T$ increases. In this example, the sixth function FX6 is defined such that the second weighting coefficient $\beta 2$ is a constant value of "0" in a range in which the deviation $\Delta T$ is equal to or smaller than the first value $\Delta T1$, the second weighting coefficient $\beta 2$ increases in proportion to the deviation $\Delta T$ in a range in which the deviation $\Delta T$ is from the first value $\Delta T1$ to the second value $\Delta T2$ (>$\Delta T1$), and the second weighting coefficient $\beta 2$ is a constant value of "1" in a range in which the deviation $\Delta T$ is larger than the second value $\Delta T2$.

The threshold value $\Delta T$th is set to be between the first value $\Delta T1$ and the second value $\Delta T2$. FIGS. 9 and 10 illustrate an example in which the threshold value $\Delta T$th is an intermediate value between the first value $\Delta T1$ and the second value $\Delta T2$ ($\Delta T$th=($\Delta T1+\Delta T2$)/2). In addition, the fifth function FX5 and the sixth function FX6 are defined such that the sum of the first weighting coefficient $\beta 1$ and the second weighting coefficient $\beta 2$ becomes "1" at each deviation $\Delta T$.

The threshold value $\Delta T$th is, for example, 20 degrees.

Figure 11:
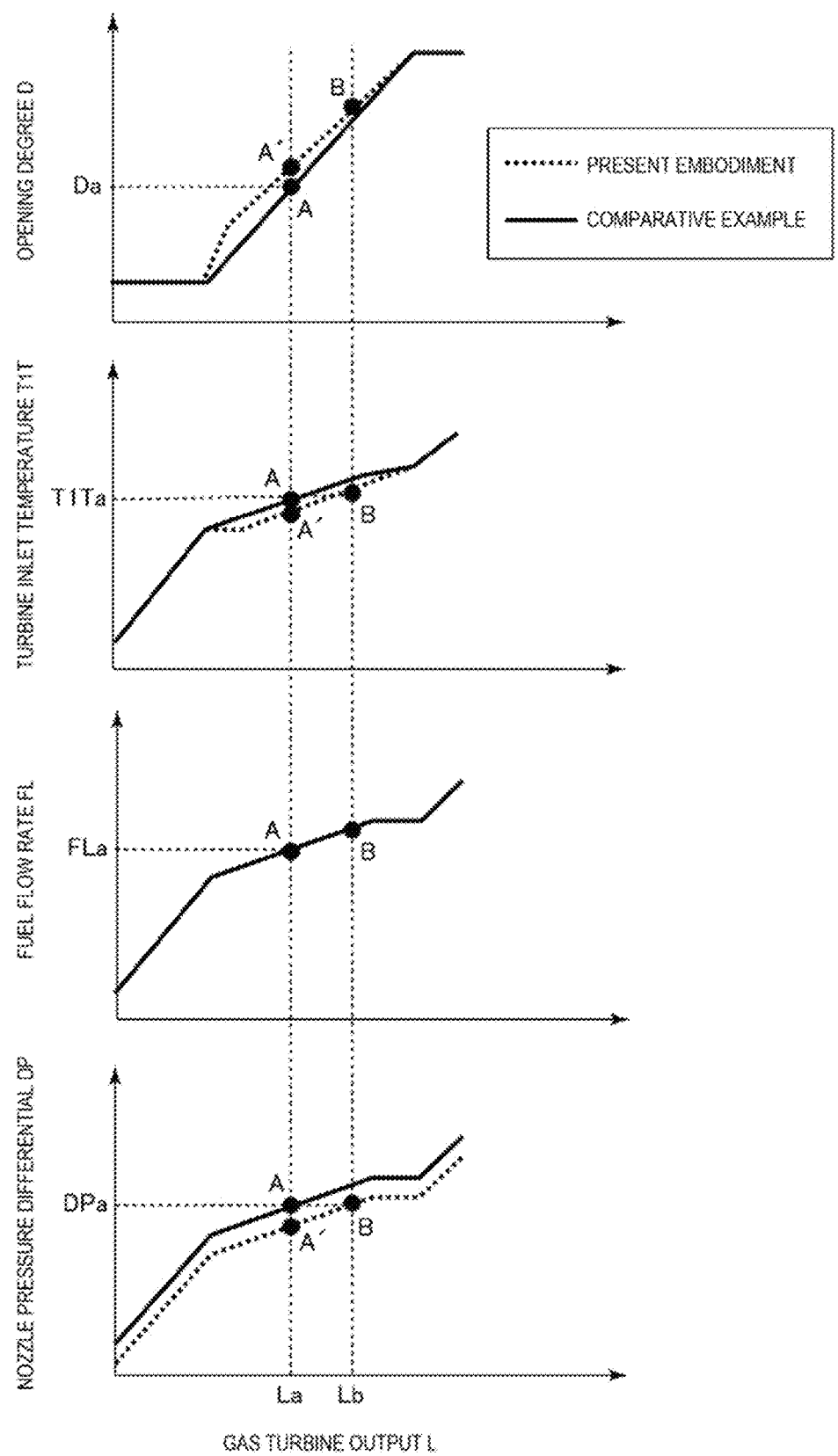
FIG. 11 is a diagram illustrating the behavior of each operation parameter of the gas turbine of FIG. 1 with respect to a gas turbine output.

Next, the gas turbine control performed by the gas turbine control device 100 having the above-described configuration will be described. FIG. 11 is a diagram illustrating the behavior of each operation parameter of the gas turbine 1 of FIG. 1 with respect to the gas turbine output L. FIG. 11 illustrates, as the operating parameters of the gas turbine 1, the opening degree D of the inlet guide vane 14, the inlet temperature of the turbine 6 (hereinafter, appropriately referred to as "turbine inlet temperature T1T"), the flow rate of the fuel F in the fuel supply line 62 (hereinafter, appropriately referred to as "fuel flow rate FL"), and a nozzle pressure differential DP in the fuel injection nozzle 50. In FIG. 11, the behavior of the gas turbine 1 according to the present embodiment is indicated by broken lines, and the behavior of a comparative example is indicated by solid lines. This comparative example corresponds to a case where the same opening degree control is performed regardless of the deviation $\Delta T$, unlike the present embodiment where when the deviation $\Delta T$ is larger than the threshold value $\Delta T$th, the opening degree D of the inlet guide vane 14 is increased to be larger than the opening degree when the deviation $\Delta T$ is equal to or smaller than the threshold value $\Delta T$th (that is, the comparative example corresponds to a case where the opening degree control is performed by using the second opening degree target value Dt2 as the opening degree target value Dt).

When the gas turbine output L gradually increases during the startup of the gas turbine 1 or at the time of increasing a load on the gas turbine 1 from a low load state, each of the opening degree D of the inlet guide vane 14, the turbine inlet temperature T1T, the fuel flow rate FL, and the nozzle pressure differential DP is controlled to gradually increase. In the present embodiment, as compared with the comparative example, the opening degree D of the inlet guide vane 14 is controlled to become larger, whereby the supply amount of the compressed air to the combustor 4 is increased, and accordingly, the turbine inlet temperature T1T is also decreased.

Here, the comparative example assumes a case where at an operating point A which is a gas turbine output La, the temperature of the fuel supplied to the combustor 4 is low, and thus combustion oscillation occurs in the combustor 4. The operating point A is an operating point determined by an opening degree Da of the inlet guide vane 14, a turbine inlet temperature T1Ta, a fuel flow rate FLa, and a nozzle pressure differential DPa. On the other hand, in the present embodiment, at an operating point A' having the gas turbine output La equivalent to that at the operating point A, the opening degree D becomes larger than that at the operating point A, and thus the turbine inlet temperature T1T becomes lower. Thus, in the present embodiment, an operating point at which the turbine inlet temperature T1Ta and the nozzle pressure differential DPa are equivalent to those at the operating point A is an operating point B corresponding to a turbine output Lb (>La). This indicates that in the present embodiment, when the deviation ΔT is larger than the threshold value ΔTth, the equivalent operating point is shifted to a high output side as compared with the comparative example.

As described above, even when combustion oscillation occurs at the operating point A in the comparative example, in the present embodiment, the opening degree D of the inlet guide vane 14 is controlled to become larger than that in the comparative example, and thus the equivalent operating point is shifted to the operating point A' on the high output side. As a result, even when combustion oscillation occurs at the operating point A, the operating point is shifted to the operating point A', and thus the occurrence of combustion oscillation can be avoided. The avoidance of combustion oscillation is performed by controlling the opening degree of the inlet guide vane 14, and thus can be performed regardless of the design condition of the nozzle pressure differential DP in the fuel injection nozzle 50.

Figure 12:
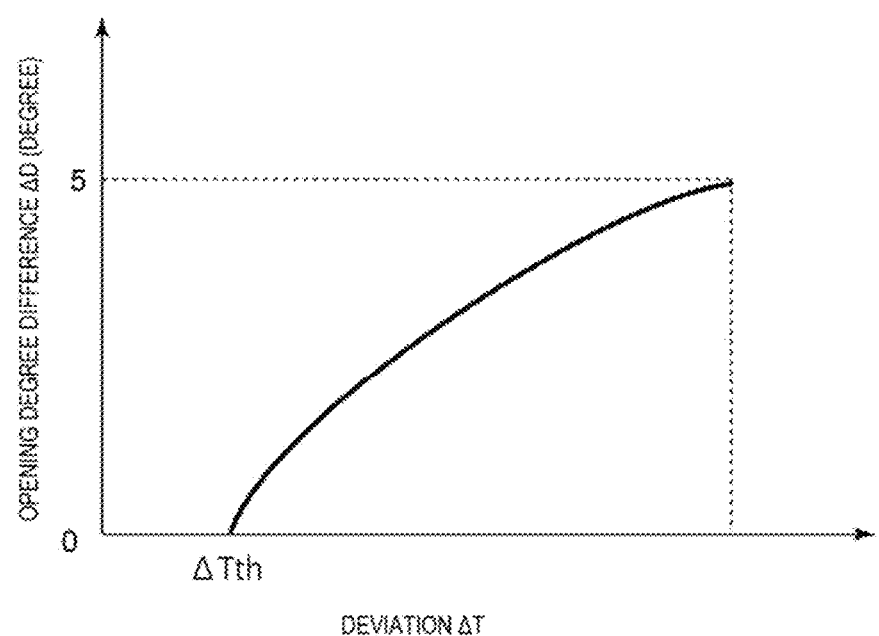
FIG. 12 is a graph illustrating characteristics with respect to a deviation of an opening degree difference of an inlet guide vane between the present embodiment and a comparative example of FIG. 11.

FIG. 12 is a graph illustrating characteristics with respect to the deviation ΔT of an opening degree difference ΔD of the inlet guide vane 14 between the present embodiment and the comparative example of FIG. 11. As illustrated in FIG. 12, the opening degree difference ΔD has characteristics of increasing as the deviation ΔT increases. In this way, the opening degree difference ΔD, which is an increasing adjustment amount of the inlet guide vane 14, is controlled to increase as the deviation ΔT between the set temperature Ts in the heater 64 and the fuel temperature Tf increases. Accordingly, by increasing the adjustment amount for the opening degree D of the inlet guide vane 14 as the fuel temperature Tf supplied to the combustor 4 is lower, the shift amount of the operating point to the high output side described above increases, and thus the operating point at which combustion oscillation occurs can be more suitably avoided.

Note that as illustrated in FIG. 12, the opening degree difference ΔD increases together with the deviation ΔT, but the maximum value thereof is preferably 4 to 6 degrees.

According to each of the embodiments described above, it is possible to provide the gas turbine control device 100 and the gas turbine control method that can suitably avoid combustion oscillation that occurs when the fuel temperature Tf is low regardless of the design condition of the nozzle pressure differential of the combustor 4.

In addition, it is possible to replace the components in the above-described embodiments with well-known components as appropriate without departing from the essence of the disclosure, and the above-described embodiments may be combined as appropriate.

The contents described in the above embodiments are understood as follows, for example.

(1) A gas turbine control device according to one aspect is a gas turbine control device for controlling a gas turbine including a combustor that can combust fuel by mixing the fuel with compressed air;
a heater for heating the fuel to a set temperature;
a compressor for generating the compressed air; and
an inlet guide vane for adjusting an amount of intake air of the compressor, and includes
a fuel temperature detection unit for detecting a temperature of the fuel at an outlet section of the heater; and
an inlet guide vane control unit for controlling an opening degree of the inlet guide vane based on an output of the gas turbine.

When a deviation between the temperature of the fuel detected by the fuel temperature detection unit and the set temperature exceeds a threshold value, the inlet guide vane control unit controls the opening degree of the inlet guide vane to become larger than the opening degree when the deviation is equal to or smaller than the threshold value.

According to the aspect of (1) described above, when the deviation between the detected value of the fuel temperature and the set temperature of the heater increases in excess of the threshold value, the opening degree of the inlet guide vane is controlled to become larger than the opening degree when the deviation is equal to or smaller than the threshold value. For example, it is assumed that combustion oscillation occurs in the combustor at a certain operating point because the temperature of the fuel supplied to the combustor is low. In this case, by adjusting the opening degree of the inlet guide vane to be large, the amount of the intake air of the compressor increases, and thus the turbine inlet temperature decreases. Thus, an operating point having a turbine inlet temperature and a nozzle pressure differential equivalent to those of the above-described certain operating point is shifted to the high output side as compared with before the adjustment of the opening degree of the inlet guide vane. In this way, when the deviation increases in excess of the threshold value, the operating point at which combustion oscillation occurs can be avoided by shifting the operating point to the high output side through the adjustment of the opening degree of the inlet guide vane.

(2) According to another aspect, in the aspect of (1) described above, the inlet guide vane control unit controls the inlet guide vane such that an opening degree difference between the opening degree when the deviation exceeds the threshold value and the opening degree when the deviation is equal to or smaller than the threshold value increases as the deviation increases.

According to the aspect of (2) described above, an increasing adjustment amount (the opening degree difference from a case where the deviation is equal to or smaller than the threshold value) of the inlet guide vane is controlled to increase as the deviation between the set temperature of the heater and the actual fuel temperature at the outlet section of the heater increases. Thus, by increasing the adjustment amount for the opening degree of the inlet guide vane as the fuel temperature supplied to the combustor is lower, the shift amount of the operating point to the high output side described above is increased, and thus the operating point at which combustion oscillation occurs can be more suitably avoided.

(3) According to another aspect, in the aspect of (2) described above, the maximum value of the opening degree difference is 4 to 6 degrees.

According to the aspect of (3) described above, when the opening degree difference is increased based on the deviation as described above, the maximum value of the opening degree difference is set to be 4 to 6 degrees, whereby the occurrence of combustion oscillation can be suitably avoided.

(4) According to another aspect, in any one of the aspects of (1) to (3) described above, the inlet guide vane control unit controls the opening degree of the inlet guide vane so as to become an opening degree target value obtained by adding a first opening degree and a second opening degree with a weighting coefficient predetermined, the first opening degree being calculated based on a first function defining a relationship between the output and the opening degree such that the opening degree increases as the output increases, the second opening degree being calculated based on a second function defining a relationship between the output and the opening degree such that the opening degree increases at an increase rate larger than an increase rate in the first function as the output increases.

According to the aspect of (4) described above, the target value (the opening degree target value) in the control of the opening degree of the inlet guide vane is obtained by adding the first opening degree calculated based on the first function and the second opening degree calculated based on the second function by using the weighting coefficient. Thus, when the deviation increases in excess of the threshold value, the opening degree of the inlet guide vane is controlled to become larger than the opening degree when the deviation is equal to or smaller than the threshold value, whereby the operating point of the gas turbine is shifted to the high output side and the operating point at which combustion oscillation occurs can be suitably avoided.

(5) According to another aspect, in the aspect of (4) described above, the weighting coefficient is set such that a ratio of the second opening degree to the opening degree target value increases as the deviation increases.

According to the aspect of (5) described above, when the opening degree target value is calculated by adding the first opening degree and the second opening degree by using the weighting coefficient, a proportion of the second opening degree in the opening degree target value increases as the deviation increases. Accordingly, when the deviation increases in excess of the threshold value, the opening degree of the inlet guide vane can be controlled to become larger as the deviation is larger, and thus the occurrence of the combustion oscillation can be suitably avoided.

(6) According to another aspect, in any one of the aspects of (1) to (5) described above, the opening degree target value of the inlet guide vane is corrected by a first correction coefficient that is set to increase as the intake air temperature of the compressor decreases.

According to the aspect of (6) described above, the target value (the opening degree target value) in the control of the opening degree of the inlet guide vane is corrected based on the intake air temperature of the compressor. By correcting the opening degree target value in response to a change in the intake air temperature as described above, even when the fuel temperature is low to such an extent that the deviation exceeds the threshold value, the operating point at which combustion oscillation occurs can be suitably avoided by adjusting the opening degree of the inlet guide vane.

(7) According to another aspect, in any one of the aspects of (1) to (6) described above, the opening degree target value of the inlet guide vane is corrected by a second correction coefficient that is set based on a calorie value of the fuel.

According to the aspect of (7) described above, the target value (the opening degree target value) in the control of the opening degree of the inlet guide vane is corrected based on the calorie value of the fuel combusted in the combustor. By correcting the opening degree target value in response to a change in the calorie value of the fuel as described above, even when the fuel temperature is low to such an extent that the deviation exceeds the threshold value, the operating point at which combustion oscillation occurs can be suitably avoided by adjusting the opening degree of the inlet guide vane.

(8) According to another aspect, in any one of the aspects of (1) to (7) described above, the threshold value is 20 degrees.

According to the aspect of (8) described above, when the deviation increases in excess of 20 degrees, the opening degree of the inlet guide vane is controlled to increase, whereby the occurrence of combustion oscillation can be suitably avoided.

(9) A gas turbine control method according to one aspect is a gas turbine control method for controlling a gas turbine including
    a combustor that can combust fuel by mixing the fuel with compressed air;
    a heater for heating the fuel to a set temperature;
    a compressor for generating the compressed air; and
    an inlet guide vane for adjusting an amount of intake air of the compressor, and includes
    detecting a temperature of the fuel at an outlet section of the heater; and
    controlling an opening degree of the inlet guide vane based on an output of the gas turbine.

In the controlling the inlet guide vane, when a deviation between the temperature of the fuel detected in the detecting and the set temperature exceeds a threshold value, the opening degree of the inlet guide vane is controlled to become larger than the opening degree when the deviation is equal to or smaller than the threshold value.

According to the aspect of (9) described above, when the deviation between the detected value of the fuel temperature and the set temperature of the heater increases in excess of the threshold value, the opening degree of the inlet guide vane is controlled to become larger than the opening degree when the deviation is equal to or smaller than the threshold value. For example, it is assumed that combustion oscillation occurs in the combustor at a certain operating point because the temperature of the fuel supplied to the combustor is low. In this case, by adjusting the opening degree of the inlet guide vane to be large, the amount of the intake air of the compressor increases, and thus the turbine inlet temperature decreases. Thus, an operating point having a turbine inlet temperature and a nozzle pressure differential equivalent to those of the above-described certain operating point is shifted to the high output side as compared with before the adjustment of the opening degree of the inlet guide vane. In this way, when the deviation increases in excess of the threshold value, the operating point at which combustion oscillation occurs can be avoided by shifting the operating point to the high output side through the adjustment of the opening degree of the inlet guide vane.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A gas turbine control device configured to control a gas turbine including
    a combustor configured to combust fuel by mixing the fuel with compressed air;
    a heater configured to heat the fuel to a set temperature;
    a compressor configured to generate the compressed air; and
    an inlet guide vane configured to adjust an amount of intake air of the compressor,
the gas turbine control device comprising:
    a fuel temperature detection unit configured to detect a temperature of the fuel at an outlet section of the heater; and an inlet guide vane control unit configured to control an opening degree of the inlet guide vane based on an output of the gas turbine, wherein when a deviation between the temperature of the fuel detected by the fuel temperature detection unit and the set temperature exceeds a threshold value, the inlet guide vane control unit controls the opening degree of the inlet guide vane to become larger than the opening degree when the deviation is equal to or smaller than the threshold value.

2. The gas turbine control device according to claim 1, wherein the inlet guide vane control unit controls the inlet guide vane such that an opening degree difference between the opening degree when the deviation exceeds the threshold value and the opening degree when the deviation is equal to or smaller than the threshold value increases as the deviation increases.

3. The gas turbine control device according to claim 2, wherein a maximum value of the opening degree difference is 4 to 6 degrees.

4. The gas turbine control device according to claim 1, wherein the inlet guide vane control unit controls the opening degree of the inlet guide vane so as to become an opening degree target value obtained by adding a first opening degree and a second opening degree with a weighting coefficient predetermined, the first opening degree being calculated based on a first function defining a relationship between the output and the opening degree such that the opening degree increases as the output increases, the second opening degree being calculated based on a second function defining a relationship between the output and the opening degree such that the opening degree increases at an increase rate larger than an increase rate in the first function as the output increases.

5. The gas turbine control device according to claim 4, wherein the weighting coefficient is set such that a ratio of the second opening degree to the opening degree target value increases as the deviation increases.

6. The gas turbine control device according to claim 1, wherein the opening degree target value of the inlet guide vane is corrected by a first correction coefficient that is set to increase as a temperature of the intake air of the compressor decreases.

7. The gas turbine control device according to claim 1, wherein the opening degree target value of the inlet guide vane is corrected by a second correction coefficient that is set based on a calorie value of the fuel.

8. The gas turbine control device according to claim 1, wherein the threshold value is 20 degrees.

9. A gas turbine control method that controls a gas turbine including
a combustor configured to combust fuel by mixing the fuel with compressed air;
a heater configured to heat the fuel to a set temperature;
a compressor configured to generate the compressed air; and
an inlet guide vane configured to adjust an amount of intake air of the compressor,
the gas turbine control method comprising:
detecting a temperature of the fuel at an outlet section of the heater; and
controlling an opening degree of the inlet guide vane based on an output of the gas turbine,
wherein in the controlling the inlet guide vane, when a deviation between the temperature of the fuel detected in the detecting and the set temperature exceeds a threshold value, the opening degree of the inlet guide vane is controlled to become larger than the opening degree when the deviation is equal to or smaller than the threshold value.

* * * * *